United States Patent [19]
Ochi et al.

[11] Patent Number: 5,928,413
[45] Date of Patent: Jul. 27, 1999

[54] FLUE GAS TREATING SYSTEM AND PROCESS

[75] Inventors: Eiji Ochi; Kiyoshi Okazoe, both of Tokyo; Toru Takashina, Hiroshima, all of Japan

[73] Assignee: Mitsubishi Heavy Industries, Ltd., Tokyo, Japan

[21] Appl. No.: 08/927,306

[22] Filed: Sep. 11, 1997

[30] Foreign Application Priority Data

Oct. 25, 1996 [JP] Japan ................................. 8-301038

[51] Int. Cl.⁶ ................................................ B01D 53/34
[52] U.S. Cl. ............................. 95/177; 95/181; 95/187; 95/232; 95/235; 96/181; 96/182
[58] Field of Search ............................. 95/177, 181, 185, 95/187, 188, 232, 235; 96/181, 182, 183, 188; 423/242, 235; 422/171, 176

[56] References Cited

U.S. PATENT DOCUMENTS

| | | | |
|---|---|---|---|
| 3,892,837 | 7/1975 | Uchiyama et al. | 423/242 |
| 3,927,178 | 12/1975 | Jordan et al. | 423/242 |
| 4,093,544 | 6/1978 | Ross | 96/181 |
| 4,156,712 | 5/1979 | Kanai et al. | 423/242 |
| 4,166,838 | 9/1979 | Tatani et al. | 423/242 |
| 4,229,417 | 10/1980 | Kanai et al. | 422/176 |
| 4,976,751 | 12/1990 | Schippert | 95/188 |
| 5,106,601 | 4/1992 | Chang et al. | 423/242 |
| 5,202,103 | 4/1993 | Chang et al. | 423/243 |
| 5,630,991 | 5/1997 | Gau et al. | 423/243.01 |
| 5,665,317 | 9/1997 | Laslo | 422/171 |

FOREIGN PATENT DOCUMENTS 6-327927  11/1994  Japan .

*Primary Examiner*—Jay H. Woo
*Assistant Examiner*—Minh-Chau T. Pham
*Attorney, Agent, or Firm*—Myers Bigel Sibley & Sajovec

[57] ABSTRACT

This invention provides a flue gas treating system and process which include a counterflow absorption tower and which can reduce the ammonia concentration in the treated flue gas to a low level. This system includes an absorbing fluid tank (21) which is installed separately from an absorption tower tank (1) and into which the absorbing fluid after coming into gas-liquid contact with untreated flue gas in an absorption tower (2) and before flowing down into the absorption tower tank (1) is introduced; first injection means for injecting the absorbing fluid within the absorption tower tank (1) into the absorption tower (2) at a first position above the flue gas inlet section (3) thereof so as to bring this absorbing fluid into gas-liquid contact with the untreated flue gas; and second injection means for injecting the absorbing fluid within the absorbing fluid tank (21) into the absorption tower (2) at a second position above the first position so as to bring this absorbing fluid into gas-liquid contact with the untreated flue gas prior to the absorbing fluid within the absorption tower tank (1).

2 Claims, 3 Drawing Sheets

FLUE GAS TREATING SYSTEM AND PROCESS

FIELD OF THE INVENTION AND RELATED ART STATEMENT

This invention relates to a technique for efficiently carrying out the desulfurization of flue gas and the removal of ammonia with small-sized equipment construction. More particularly, it relates to a flue gas treating system and process which can achieve a high degree of ammonia removal.

Conventionally, there have been known such flue gas treating processes using an absorption tower of the packed tower type or an absorption tower of the spray tower or liquid column type. In these absorption towers, sulfur oxides (typically sulfur dioxide) and other contaminants present in flue gas are removed by bringing the flue gas into gas-liquid contact with an absorbing fluid having an absorbent (e.g., limestone) suspended therein.

With respect to flue gas treating systems of the single-tower type, it is known that a small-sized and high-performance system can be constructed by using a counterflow absorption tower having high gas-liquid contact efficiency. One example of such a flue gas treating system and process using a counterflow absorption tower is described below with reference to FIG. 3.

In this flue gas treating process, there is used an absorption tower 2 of the liquid column type that has at its bottom a tank 1 to which an absorbing fluid having an absorbent (i.e., limestone) suspended therein (hereinafter referred to as the absorbent slurry) is fed and that serves to bring untreated flue gas A into gas-liquid contact with the absorbent slurry within tank 1 in a gas-liquid contact section formed above tank 1.

The aforesaid absorption tower 2 is a so-called counterflow absorption tower in which a flue gas inlet section 3 for introducing untreated flue gas A is formed in its lower part and a flue gas outlet section (not shown) for discharging treated flue gas B is formed at its upper end, so that flue gas is introduced from its lower part and caused to flow upward.

A mist eliminator 2a is installed in the upper part of absorption tower 2. Thus, the mist produced by gas-liquid contact and entrained by the flue gas is collected so that a large amount of mist containing sulfur dioxide and the like will not be discharged together with treated flue gas B. In this case, the mist collected by this mist eliminator 2a is allowed to flow down from its lower end and return directly to tank 1.

Moreover, in absorption tower 2, a plurality of spray pipes 4 are disposed in parallel. In these spray pipes 4, a plurality of nozzles (not shown) for injecting the absorbent slurry upward in the form of liquid columns are formed.

Furthermore, a circulating pump 5 for withdrawing and raising the absorbent slurry within tank 1 is installed on the outside of tank 1. Thus, the absorbent slurry is fed to spray nozzles 4 through a circulation line 6.

As a means for blowing air C for oxidizing use into the slurry within tank 1 in the form of fine air bubbles while agitating the slurry, the flue gas treating system of FIG. 3 is equipped with an agitator 7 and a blow pipe 8 for blowing air C into the slurry in the vicinity of the agitating blades of this agitator 7. Thus, the absorbent slurry having sulfur dioxide absorbed therein is brought into efficient contact with the air in tank 1 and thereby completely oxidized to form gypsum.

More specifically, the absorbent slurry injected from spray pipes 4 within absorption tower 2 flows downward while absorbing sulfur dioxide and dust as a result of gas-liquid contact with flue gas, and enters tank 1 where it is oxidized by contact with a large number of air bubbles blown thereinto while being agitated with agitator 7 and blow pipe 8, and then undergoes a neutralization reaction to become a slurry containing gypsum at a high concentration. The dominant reactions occurring in the course of these treatments are represented by the following reaction formulas (1) to (3).

Flue gas inlet section of absorption tower $$SO_2 + H_2O \rightarrow H^+ + HSO_3^- \tag{1}$$

Tank $$H^+ + HSO_3^- + 1/2 O_2 \rightarrow 2H^+ + SO_4^{2-} \tag{2}$$

$$2H^+ + SO_4^{2-} + CaCO_3 + H_2O \rightarrow CaSO_4 \cdot 2H_2O + CO_2 \tag{3}$$

Thus, a large amount of gypsum, a small amount of limestone (used as the absorbent), and a slight amount of dust collected from the flue gas are steadily suspended or dissolved in the slurry within tank 1. In this process, the slurry within tank 1 is withdrawn and fed to a solid-liquid separator 9 through a pipe line 6a branching from circulation line 6. The slurry is filtered in solid-liquid separator 9, so that gypsum D having a low water content is recovered. On the other hand, the filtrate from solid-liquid separator 9 is introduced into a filtrate tank 10 and then delivered by means of a pump 11. A portion of the filtrate is recycled to tank 1 as water constituting the absorbent slurry, and the remainder is discharged as desulfurization waste water E in order to prevent the accumulation of impurities.

In this process, a slurry containing limestone as the absorbent is fed from a slurry preparation tank 12 to tank 1 during operation. This slurry preparation tank 12 is equipped with a stirrer 13 and serves to prepare an absorbent slurry by mixing powdered limestone F introduced from a silo (not shown) with supplied water G (such as industrial water), and stirring this mixture. The absorbent slurry within slurry preparation tank 12 is suitably fed to tank 1 by means of a slurry pump 14.

Moreover, in order to make up for the water gradually lost owing to evaporation in absorption tower 2 or the like, make-up water (such as industrial water) is suitably supplied, for example, to tank 1.

During operation, the flow rate of the aforesaid make-up water supplied to tank 1, the flow rate of the slurry withdrawn through pipe line 6a, and the like are suitably controlled. Thus, tank 1 is maintained in such a state that the slurry containing gypsum and the absorbent at predetermined concentrations is always stored therein at a level within certain limits.

Also during operation, in order to maintain the degree of desulfurization and the purity of gypsum at a high level, the boiler load (i.e., the flow rate of flue gas A), the sulfur dioxide concentration in untreated flue gas A, the pH and limestone concentration of the absorbent slurry within tank 1, and the like are detected with sensors. On the basis of the results of detection, the feed rate of limestone to tank 1 and other parameters are suitably controlled by means of a controller (not shown). Conventionally, the pH of the absorbent slurry within tank 1 is usually adjusted to about 6.0 so that highly pure gypsum may be formed by accelerating the above-described oxidation reaction while maintaining the high capacity to absorb sulfur dioxide.

However, the flue gas treating process using the above-described gas-liquid contact apparatus of the counterflow type involves a problem to be solved. That is, if untreated flue gas A contains ammonia, this ammonia is released as a gas in absorption tower 2 and, as a result, a large amount of ammonia is discharged together with treated flue gas B.

More specifically, in a flue gas treating system used, for example, for an oil-fired boiler of a thermal electric power plant, ammonia is usually injected into flue gas at a position upstream of the desulfurizer in order to capture sulfur trioxide ($SO_3$) present in the flue gas as ammonium sulfate [$(NH_4)_2SO_4$]. Consequently, untreated flue gas A introduced into an absorption tower for desulfurizing purposes contains ammonia in an amount of up to about 100 ppm. In the conventional gas-liquid contact apparatus of the counterflow type illustrated in FIG. 3, the ammonia present in untreated flue gas A is dissolved and absorbed into the slurry while untreated flue gas A introduced through flue gas inlet section 3 comes into gas-liquid contact with the slurry which is injected into absorption tower 2 and flows down therein. However, since the slurry injected into the upper part of absorption tower 2 has a high pH value of about 6, the partial pressure of ammonia in the upper part of this absorption tower 2 is increased. As a result, the ammonia contained in the slurry is released into the flue gas again, so that the ammonia concentration in treated flue gas B is eventually increased to a level of up to about 50 ppm.

Although ammonia is not yet an object of emission control in Japan, it is desirable from the viewpoint of air pollution prevention to minimize the ammonia concentration in treated flue gas B discharged into the atmosphere. Thus, there has been a demand for a flue gas treating process which can achieve a reduction in equipment size and a high degree of desulfurization and, moreover, can minimize the amount of ammonia emitted.

Accordingly, it is an object of the present invention to provide a flue gas treating system and process which, though having a basic construction using a counterflow absorption tower, can reduce the ammonia concentration in the treated flue gas to a low level.

SUMMARY OF THE INVENTION

In order to accomplish the above object, the present invention provides a flue gas treating system for removing at least sulfur dioxide and ammonia present in flue gas by gas-liquid contact with an absorbing fluid, the flue gas treating system including a counterflow absorption tower which has at its bottom an absorption tower tank for holding an absorbing fluid fed thereto and in which untreated flue gas is introduced through a flue gas inlet section formed in its lower part and brought into gas-liquid contact with the absorbing fluid; an absorbing fluid tank which is installed separately from the absorption tower tank and into which the absorbing fluid after coming into gas-liquid contact with the untreated flue gas in the absorption tower and before flowing down into the absorption tower tank is introduced; first injection means for injecting the absorbing fluid within the absorption tower tank into the absorption tower at a first position above the flue gas inlet section thereof so as to bring this absorbing fluid into gas-liquid contact with the untreated flue gas; and second injection means for injecting the absorbing fluid within the absorbing fluid tank into the absorption tower at a second position above the first position so as to bring this absorbing fluid into gas-liquid contact with the untreated flue gas prior to the absorbing fluid within the absorption tower tank.

The present invention also provides a flue gas treating process for removing at least sulfur dioxide and ammonia present in flue gas by using the above-described flue gas treating system, which comprises adjusting the pH of the absorbing fluid within the absorbing fluid tank to a value sufficiently low to cause little ammonia to be released into the flue gas (e.g., a value in the range of 4.0 to 5.0).

In the flue gas treating system of the present invention, the absorbing fluid within the absorbing fluid tank which is injected into the upper end of the absorption tower by the second injection means is that portion of the slurry which has been brought into gas-liquid contact with untreated flue gas in the absorption tower and has been collected before flowing down into the absorption tower tank. Accordingly, even if no positive pH adjustment is made, the pH of this absorbing fluid is lower than the pH of the absorbing fluid within the absorbing fluid tank. As a result, though using a counter flow absorption tower, this system makes it possible to suppress the conventionally known phenomenon in which ammonia is released into the flue gas at the outlet of the absorption tower. It is to be understood that, owing to the absorbing fluid within the absorption tower tank which is injected into the absorption tower by the first injection means, sulfur dioxide is absorbed to at least the same extent as in the prior art.

Thus, though having a small-sized construction using a counterflow absorption tower, the system of the present invention can not only remove sulfur dioxide present in flue gas effectively, but also reduce the ammonia concentration in the treated flue gas to a lower level than in the prior art. Consequently, air pollution due to harmful materials present in flue gas can be prevented in a more practical and perfect manner.

Especially where the pH of the absorbing fluid within the absorbing fluid tank is positively adjusted to a value sufficiently low to cause little ammonia to be released into the flue gas (e.g., a value in the range of 4.0 to 5.0), not only the ammonia concentration in the treated flue gas can be reliably maintained at a low level, but also higher desulfurization capability can be achieved by preventing an excessive reduction in the pH of the absorbing fluid injected into the absorption tower by the second injection means.

DETAILED DESCRIPTION OF PREFERRED EMBODIMENTS

One embodiment of the present invention will be described hereinbelow with reference to the accompanying drawings.

Figure 1:
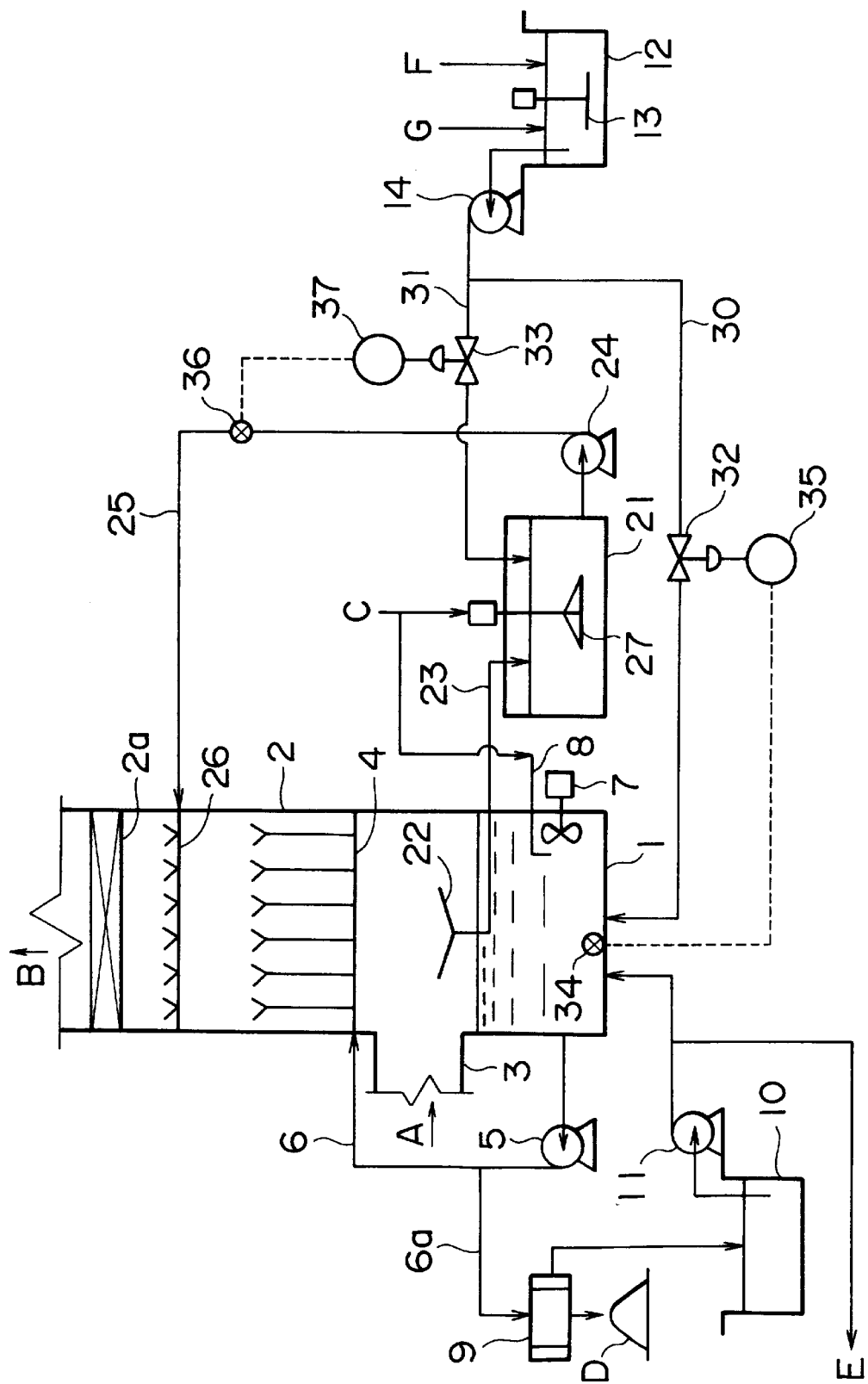
FIG. 1 is a schematic view illustrating the construction of a flue gas treating system in accordance with one embodiment of the present invention.
Figure 3:
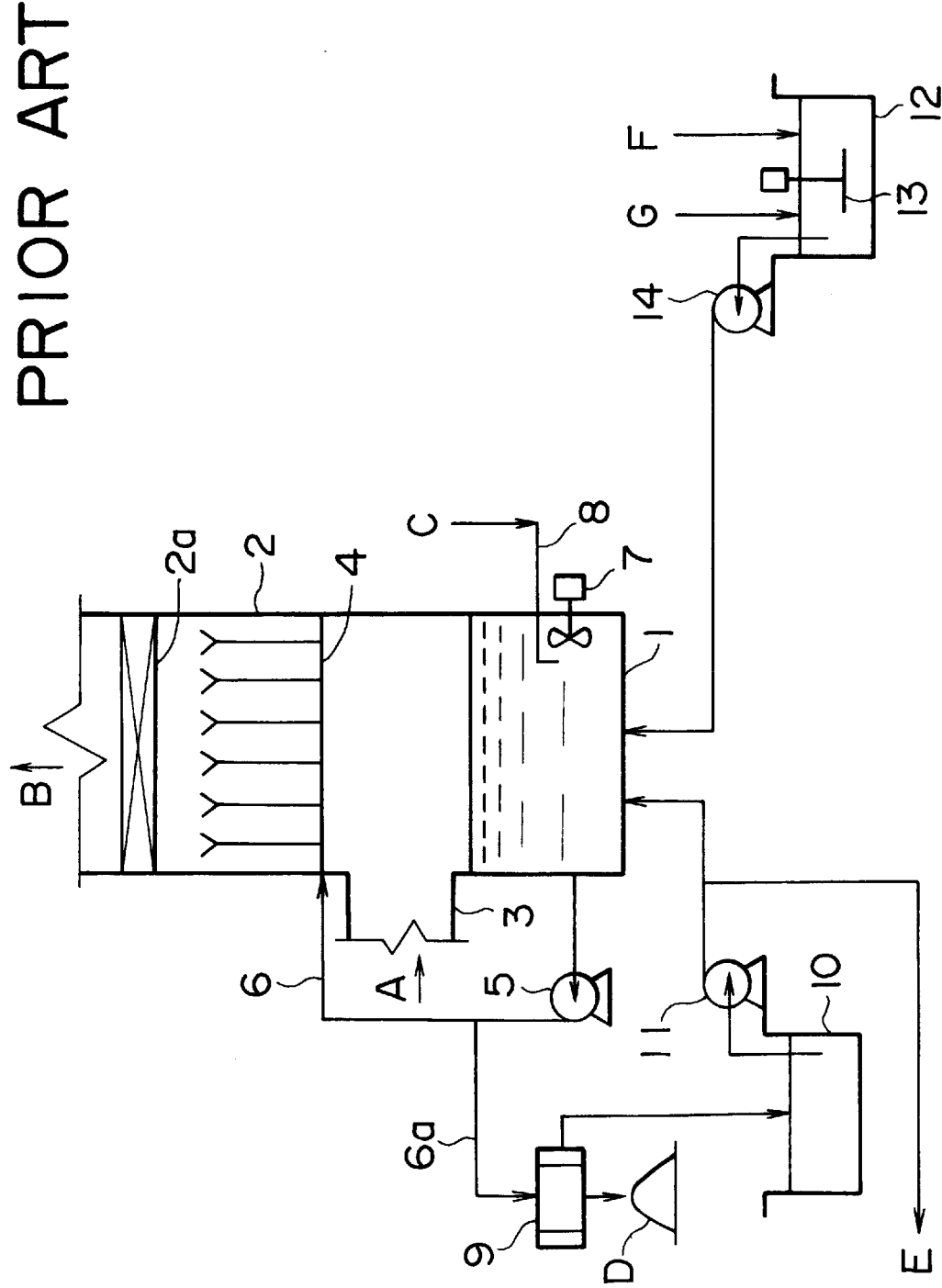
FIG. 3 is a schematic view illustrating a conventional flue gas treating system.

FIG. 1 is a schematic view illustrating the construction of a flue gas treating system in accordance with this embodiment. First of all, the construction of this system is described below. The same elements as included in the conventional system of FIG. 3 are designated by the same reference numerals, and the explanation thereof is omitted.

In this flue gas treating system, a tank 21 (i.e., an absorbing fluid tank) is installed separately from a tank 1 (i.e., an absorption tower tank) formed at the bottom of an absorption tower 2. Into this tank 21 is introduced the slurry after coming into gas-liquid contact with untreated flue gas A in absorption tower 2 and before flowing down into tank 1. That is, a slurry receiver 22 for receiving a portion of the falling slurry is disposed below spray pipes 4 (but above the surface of the slurry within tank 1), and the slurry received by this slurry receiver 22 is introduced into tank 21 through a pipe line 23.

The slurry within tank 21 is fed to the upper part of absorption tank 2 through a circulation line 25 by means of a circulating pump 24, and injected into absorption tank 2 from spray pipes 26 disposed above spray pipes 4.

Thus, in this embodiment, circulating pump 5, circulation line 6 and spray pipes 4 constitute the first injection means of the present invention for injecting the absorbing fluid within tank 1 of absorption tower 2 into absorption tower 2 at a first position above flue gas inlet section 3 thereof so as to bring this absorbing fluid into gas-liquid contact with untreated flue gas A. Moreover, circulating pump 24, circulation line 25 and spray pipes 26 constitute the second injection means of the present invention for injecting the absorbing fluid within tank 21 into absorption tower 2 at a second position above the first position so as to bring this absorbing fluid into gas-liquid contact with untreated flue gas A prior to the absorbing fluid within tank 1.

In this embodiment, tank 21 is equipped with a rotating-arm air sparger 27 for blowing air C for oxidizing use into the slurry within tank 21 in the form of fine air bubbles while agitating the slurry, so that the oxidation and other reactions represented by the aforesaid reaction formulas (2) and (3) also proceed efficiently in this tank 21.

The supply of the absorbent from a slurry preparation tank 12 for preparing an absorbent slurry to tanks 1 and 21 is separately carried out by way of two pipe lines (i.e., lines 30 and 31) branching from the delivery side of a pump 14. The feed rate of the absorbent slurry is regulated by controlling the opening of flow control valves 32 and 33 installed in lines 30 and 31, respectively, in the following manner.

Specifically, the opening of flow control valve 32 installed in line 30 for supplying the absorbent to tank 1 of absorption tower 2 is regulated in the usual manner by the action of a controller 35 which functions on the basis of the detection output of a limestone concentration sensor 34, the inlet sulfur dioxide concentration detected with a sensor (not shown). Thus, the pH of the slurry within tank 1 is maintained, as usual, at the optimum value (e.g., about 6.0) for the absorption and oxidation reaction of sulfur dioxide present in flue gas.

On the other hand, the opening of flow control valve 33 installed in line 31 for supplying the absorbent to tank 21 is regulated by the action of a controller 37 which functions on the basis of the detection output of a pH sensor 36. Thus, the pH of the slurry injected from spray pipes 26 into the upper part of absorption tower 2 is maintained at a value sufficiently low to cause little ammonia to be released into the flue gas (e.g., a value in the range of 4.0 to 5.0).

The aforesaid pH sensor 36 is designed to measure the pH of a portion of the slurry while it is delivered to spray pipes 26 through pipe line 25.

The control by controller 37 is carried out in such a way that, if the pH value measured with pH sensor 36 exceeds a control target value (e.g., 4.5), the feed rate of the absorbent functioning as an alkaline agent is decreased by an amount corresponding to the proportional sensitivity, and if the pH value falls below the control target value, the feed rate of the absorbent is increased by an amount corresponding to the proportional sensitivity.

Now, the operation of the above-described flue gas treating system, namely one embodiment of the flue gas treating process of the present invention, is explained below.

In the above-described system construction, untreated flue gas A which is introduced into absorption tower 2 through flue gas inlet section 3 is first brought into gas-liquid contact with the slurry injected from spray pipes 4 in the form of liquid columns, and then brought into gas-liquid contact with the slurry injected from spray pipes 26. Thus, dust and ammonia, together with sulfur dioxide, are absorbed or collected.

In this embodiment, the slurry injected from spray pipes 26 on the outlet side (i.e., the upper end) of absorption tower 2 is that portion of the slurry which has been received by slurry receiver 22, introduced into tank 21, and adjusted to a pH value sufficiently low to cause little ammonia to be released into the flue gas (e.g., a pH value in the range of 4.0 to 5.0). For this reason, the partial pressure of ammonia is suppressed in the upper part of absorption tower 2, so that the conventionally known phenomenon in which the ammonia dissolved in the slurry is conversely released into the flue gas can be avoided.

Consequently, treated flue gas B in which the concentrations of sulfur dioxide, dust and ammonia are reduced to a very low level is finally discharged from the flue gas outlet section formed at the upper end of absorption tower 2. In particular, according to calculations made by the present inventor, even when the ammonia concentration in untreated flue gas A is of the order of 100 ppm, the ammonia concentration in treated flue gas B is reduced to a level of as low as about 5 ppm.

The slurry having absorbed or collected sulfur dioxide, dust and ammonia from flue gas in absorption tower 2, except the portion received by slurry receiver 22, flows down into tank 1. The ammonia-containing mist scattered in the flue gas as a result of gas-liquid contact is collected by mist eliminator 2a and likewise returned to tank 1.

In tank 1, the sulfur dioxide absorbed into the slurry is oxidized by fine air bubbles blown into by means of blow pipe 8 and agitator 7. Thus, gypsum is formed in the usual manner according to the aforesaid reaction formulas (2) and (3) and separated by means of a solid-liquid separator 9.

In this embodiment, since the reactions represented by the aforesaid reaction formulas (2) and (3) are also effected in tank 21, the system as a whole permits these reactions to proceed efficiently. Moreover, as will be described later, the slurry injected from spray pipes 26 also performs an excellent desulfurizing function, resulting in an improvement in desulfurization capability.

The ammonia absorbed from flue gas into the slurry in absorption tower 2 is separated into the liquid phase as a result of solid-liquid separation in solid-liquid separator 9, and finally discharged from the system in the form dissolved in desulfurization waste water E drained through a pipe line branching from the delivery side of pump 11.

Thus, the flue gas treating system of this embodiment, which has a small-sized and high-performance construction using a counterflow absorption tower, can not only remove sulfur dioxide and dust effectively, but also reduce the ammonia concentration in the treated flue gas to a low level. Consequently, air pollution due to harmful materials present in flue gas can be prevented in a more practical and perfect manner.

Moreover, in the flue gas treating system of this embodiment, the pH of the absorbent slurry within tank 21 is positively regulated. Consequently, this system has a unique effect in that it is possible to reliably maintain the ammonia concentration in treated flue gas B at a low level while securing particularly high desulfurization capability.

More specifically, the pH of the slurry received by slurry receiver 22 is lower than the pH of the slurry within tank 1 as a result of contact with the flue gas containing sulfur dioxide. Thus, even in the case of a construction in which this slurry is simply introduced into tank 21 and then injected into the upper part of absorption tower 2 (i.e., a construction in which neither the absorbent is supplied to tank 21, nor its feed rate is controlled on the basis of the detected pH value), the ammonia concentration in treated flue gas B can be reduced to a lower level than in the prior art.

Moreover, in this embodiment, the pH is maintained in the optimum range (i.e., in a range sufficiently low to cause little ammonia to be released as described previously) by adding the absorbent (i.e., limestone) to tank 21 and controlling its amount added. Consequently, it is possible to reliably maintain the ammonia concentration in treated flue gas B at a low level while securing particularly high desulfurization capability.

It is to be understood that the present invention is not limited to the above-described embodiment, but may also be practiced in various other ways. For example, the absorption tower need not necessarily comprise an absorption tower of the liquid column type, but may comprise an absorption tower of the simple spray tower or packed tower type. However, since an absorption tower of the liquid column type has markedly higher dedusting capability, it is advisable to employ an absorption tower of the liquid column type in cases where flue gas contains a large amount of dust.

Moreover, the supply of an absorbent and air for oxidizing use to tank 21 is not always essential, but the slurry received by slurry receiver 22 may simply be introduced into tank 21 and then injected into the upper part of absorption tower 2. Even in this case, the pH of the slurry received by slurry receiver 22 is lower than the pH of the slurry within tank 1 as a result of contact with the flue gas containing sulfur dioxide, so that the above-described release of ammonia in the upper part of absorption tower 2 can be suppressed.

Moreover, it is not always necessary to positively control the pH of the absorbing fluid (or absorbent slurry) within the absorbing fluid tank 21 as described previously. Furthermore, the method for adjusting the pH thereof is not limited to the method comprising controlling the feed rate of the absorbent (i.e., limestone) as described in the foregoing embodiment, but the pH may also be adjust, for example, by separately adding a chemical agent such as sodium hydroxide.

In addition, there is a possibility that, under certain operating conditions, the pH of the absorbing fluid within the absorbing fluid tank may increase to a value greater than 5.0 as a result of the dissolution of unreacted absorbent (e.g., limestone). In such a case, the pH may be positively reduced by adding an acid (e.g., sulfuric acid) to the absorbing fluid tank.

In practice, where the pH of the absorbing fluid within the absorbing fluid tank is controlled, the particular present value thereof (i.e., the value sufficiently low to cause little ammonia to be released into the flue gas) may be suitably determined according to the ammonia concentration in the untreated flue gas and the allowable ammonia concentration (target value) in the treated flue gas, on the basis of the relationship described below with reference to FIG. 2.

Figure 2:
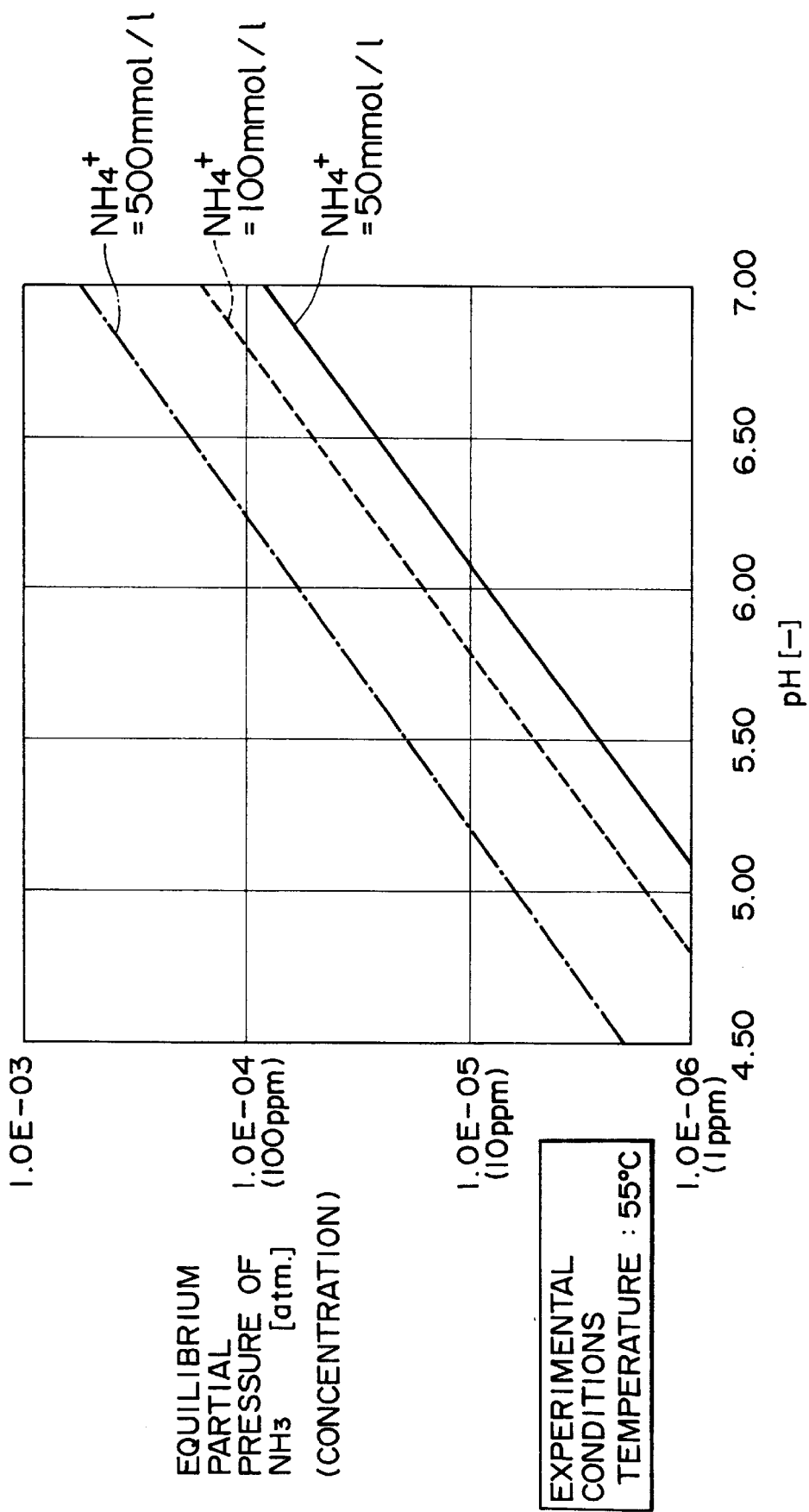
FIG. 2 is a graph showing the results of experiments on the relationship between the pH of the absorbing fluid and the equilibrium partial pressure of $NH_3$.

Specifically, as can be seen from the experimental results shown in FIG. 2, the relationship between the pH of the absorbing fluid and the equilibrium partial pressure of $NH_3$ (i.e., the ammonia concentration in the gas) varies with the amount of $NH_4^+$ accumulated in the absorbing fluid. Accordingly, on the basis of the relationship shown in FIG. 2, the upper limit of the aforesaid pH value may be determined according to the amount of $NH_4^+$ accumulated in the absorbing fluid which varies with the ammonia concentration in the untreated flue gas, and the allowable ammonia concentration in the treated flue gas.

For example, in the case of a desulfurizer for VR-fired or asphalt-fired boilers, the concentration of ammonia accumulated in the absorbing fluid is of the order of 500 mmol/l. Accordingly, in order to reduce the ammonia concentration in the treated flue gas, for example, to 10 ppm or less, it is sufficient to maintain the pH at a value of 5.0 or less as is evident from FIG. 2. If no margin is taken into account, the pH may be maintained at about 5.2.

In the case of a desulfurizer for coal-fired boilers, it is usual that no ammonia is injected on the upstream side of the desulfurizer. Accordingly, the ammonia concentration in the absorbing fluid is of the order of 5 mmol/l, and the existing processes (in which the pH has a value of, for example, about 6.0) pose no problem. However, in cases where ammonia is injected into the absorbing fluid in order, for example, to improve desulfurization capability, it is advisable to adjust the pH of the absorbing fluid within the absorbing fluid tank to a low value which may be determined according to the degree of ammonia injection on the basis of the relationship shown in FIG. 2.

However, it is desirable to maintain the desulfurization capability of the system and the quality of gypsum at a higher level. Moreover, since the absorbing fluid has a highly corrosive action on the equipment materials at a pH of less than 4, corrosion-resistant materials of higher quality are required and this detracts from economic efficiency. If these facts are taken into account, the lower limit of the pH value should preferably be 4 or greater. On the other hand, as can be seen from FIG. 2, the upper limit of the pH value should preferably be 5.0 or less so that, in the case of desulfurization for oil-fired boilers, the ammonia concentration in the treated flue gas may be reduced to 10 ppm or less under practical conditions and with high reliability.

What is claimed is:

1. A flue gas treating system for removing at least sulfur dioxide and ammonia present in flue gas by gas-liquid contact with an absorbing fluid, said flue gas treating system including a counterflow absorption tower having a bottom wherein an absorption tower tank is located for holding an absorbing fluid fed thereto and in which untreated flue gas is introduced through a flue gas inlet section formed in a lower part of the absorption tower and brought into gas-liquid contact with the absorbing fluid;

an absorbing fluid tank which is installed separately from said absorption tower tank and into which the absorbing fluid after coming into gas-liquid contact with flue gas in said absorption tower and before flowing down into said absorption tower tank is introduced;

first injection means for injecting absorbing fluid having a pH of 6.0 within said absorption tower tank into said absorption tower at a first position above the flue gas inlet section thereof so as to bring the absorbing fluid within said absorption tower tank into gas-liquid contact with the flue gas, wherein the pH of the absorbing fluid is set for effective absorption of sulfur dioxide in the flue gas; and second injection means for injecting absorbing fluid having a pH ranging from 4.0 to 5.0 within said absorbing fluid tank into said absorption tower at a second position above the first position so as to bring the absorbing fluid within said absorbing fluid tank into gas-liquid contact with the flue gas separately from the contact between the flue gas and the absorbing fluid circulated from the absorption tower tank, wherein the pH of the absorbing fluid provided by the second injection means to minimize release of ammonia into the flue gas.

2. A flue gas treating process for removing at least sulfur dioxide and ammonia present in flue gas by using a flue gas treating system as claimed in claim 1, which comprises adjusting the pH of the absorbing fluid within said absorbing fluid tank to a value sufficiently low to cause little ammonia to be released into the flue gas.

* * * * *